United States Patent
Xie et al.

(10) Patent No.: US 10,698,130 B2
(45) Date of Patent: Jun. 30, 2020

(54) STAND-ALONE SENSOR HAVING MOVABLE SHIELD

(71) Applicant: SIGNIFY HOLDING B.V., Eindhoven (NL)

(72) Inventors: Zhi Hong Xie, Shanghai (CN); Cheng Zhi Jiang, Shanghai (CN); Kai Liu, Shanghai (CN); Huang Haiming, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/021,088

(22) Filed: Jun. 28, 2018

(65) Prior Publication Data

US 2019/0212467 A1    Jul. 11, 2019

(30) Foreign Application Priority Data

Jan. 8, 2018   (CN) ................. PCT/CN2018/071723
Feb. 8, 2018   (EP) .................................... 18155753

(51) Int. Cl.
*G01J 5/04*        (2006.01)
*G01V 8/00*        (2006.01)
*G01J 5/08*        (2006.01)

(52) U.S. Cl.
CPC ................ *G01V 8/005* (2013.01); *G01J 5/04* (2013.01); *G01V 8/00* (2013.01); *G01J 5/0806* (2013.01)

(58) Field of Classification Search
CPC .... G01J 5/00; H04N 5/30; H04N 5/33; H04N 7/188; H04N 5/23203; H04N 37/02
See application file for complete search history.

(56) References Cited

U.S. PATENT DOCUMENTS

| | | | | |
|---|---|---|---|---|
| 4,672,206 A | * | 6/1987 | Suzuki | G08B 13/193 250/342 |
| 2008/0291036 A1 | * | 11/2008 | Richmond | G08B 17/10 340/628 |
| 2016/0044224 A1 | * | 2/2016 | Henry | G03B 9/10 348/368 |
| 2016/0065820 A1 | * | 3/2016 | Yamamoto | H04N 5/2351 348/151 |
| 2017/0144613 A1 | * | 5/2017 | Catlin | B60R 11/0241 |

OTHER PUBLICATIONS https://www.acuitybrands.com/products/detail/754371/Sensor-Switch/Haleon/Fixture-Integrated-Occupancy-Sensor-with-Dimming-Photocell.
http://www.pirlighting.com/sale-9504191-dc24v-ceiling-wall-switch-motion-sensor-with-springs-and-lens-hood.html.

* cited by examiner

*Primary Examiner* — David P Porta
*Assistant Examiner* — Mamadou Faye
(74) *Attorney, Agent, or Firm* — Akarsh P. Belagodu

(57) ABSTRACT

A stand-alone sensor includes a main part, a sensing head mounting on the main part, and a movable shield retractably disposed in the main part. The movable shield is rotatable around the sensing head when protruded from the main part.

12 Claims, 8 Drawing Sheets

STAND-ALONE SENSOR HAVING MOVABLE SHIELD

FIELD OF THE INVENTION

The present invention relates to a stand-alone sensor. More particularly, the present invention relates to a wireless sensor that complies with a wireless communication standard, such as, Zigbee.

BACKGROUND OF THE INVENTION

There is issue of false triggering in current occupancy sensors.

SUMMARY OF THE INVENTION

The present invention seeks to provide a stand-alone sensor with less risk of false triggering.

According to an embodiment, there is provided a stand-alone sensor comprising a main part, a sensing head mounting on the main part, and a movable shield retractably disposed in the main part, wherein the movable shield is rotatable around the sensing head when protruded from the main part.

Preferably, the stand-alone sensor further comprises a cover, a guide, and a lens, wherein the shield and the lens can be rotated together alone the guide.

Further, the cover has a main surface acting as a panel of the sensor, the shield can be hidden in a housing inside the cover and kept flush with the panel at a first position, and be pulled to a second position protruding out of the panel.

Further, the shield can be rotated around the sensing head when the shield is pulled to the second position.

According to another embodiment, the sensing head can detect occupancy of a live objective with pyroelectric infrared effect, and the shield can prevent a pyroelectric infrared signal arrives the sensing head at a predetermined direction.

The stand-alone sensor may further comprises a second sensing head for anyone from a group of daylight sensing, temperature/humidity sensing, smoke/particle sensing, and noise sensing.

According to another embodiment, the stand-alone sensor is powered with a battery.

The stand-alone sensor may be mounted on a ceiling.

According to another embodiment, there is provided a stand-alone sensor comprising a main part, a sensing head mounting on the main part, and a movable shield retractably disposed in the main part, wherein the movable shield is rotatable around the sensing head when protruded from the main part. The stand-alone sensor further comprises a push button mechanism coupled with the shield.

The push button mechanism comprises a spring, a cylinder, and a locking mechanism. The spring is disposed within the cylinder which supports the locking mechanism when assembled.

The shield is disposed within the main part at a retracted first position and releasable from the first position to a protruded second position.

The shield is released from the first position to the second position by pushing the shield along a downward direction to unlock the locking mechanism and by using an elastic restoration force of the spring to push the shield upward to the second position.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1A:
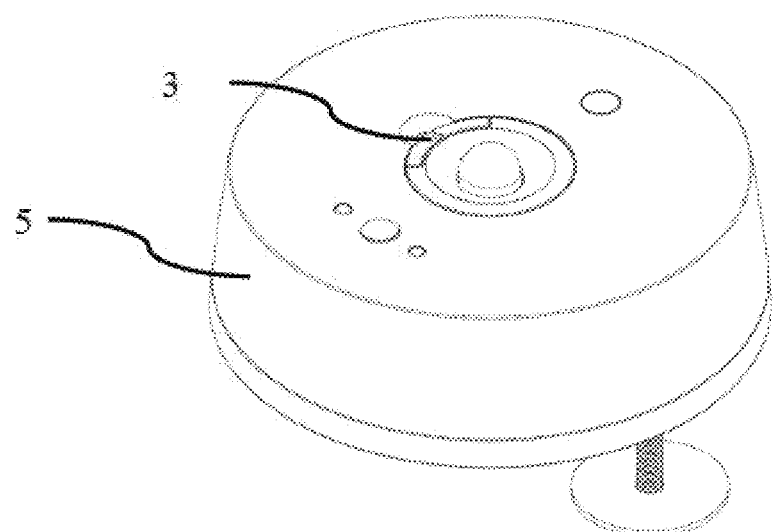
FIGS. 1(a) and 1(b) schematically depict overviews of embodiments of the stand-alone sensor according to the present invention while the shield is at a first position (rests within the sensor)

It should be understood that the Figures are merely schematic and are not drawn to scale. It should also be understood that the same reference numerals are used throughout the Figures to indicate the same or similar parts.

Figure 1B:
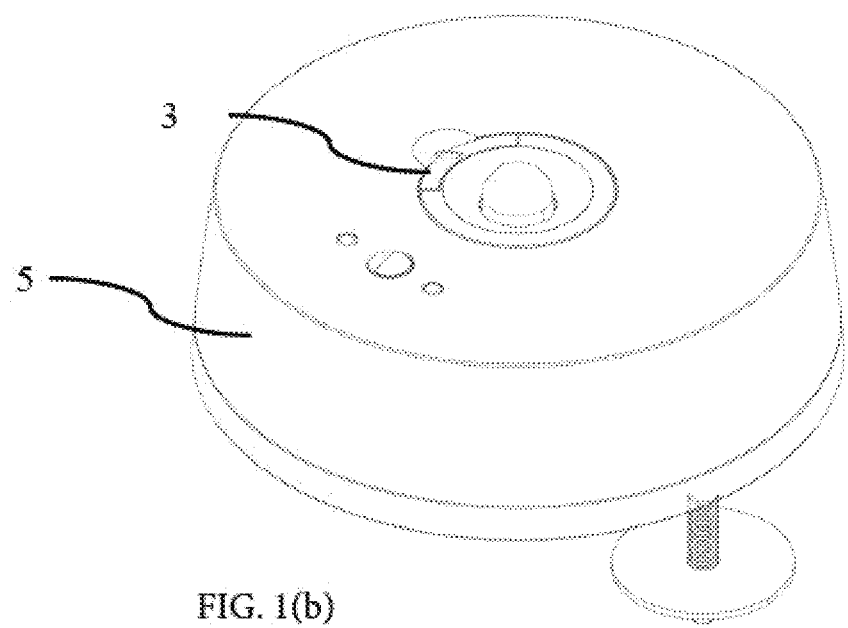

This product can detect occupancy status by PIR (Pyroelectric Infrared) technology. It may also measure daylight level of environment with an additional light sensor. FIG. 1(a) shows the sensor with multiple sensing functions and FIG. 1(b) shows a single sensing function sensor. The sensor shown in FIGS. 1(a) and 1(b) is ceiling mounted and Battery powered. Its wireless communication may be based on ZigBee Green Power standard with super longer lifetime (>7 years). It should be compliant with global standards, such as CE, UL, RED and FCC, etc.

The typical application is office/industry/classroom/carpark.

Figure 2:
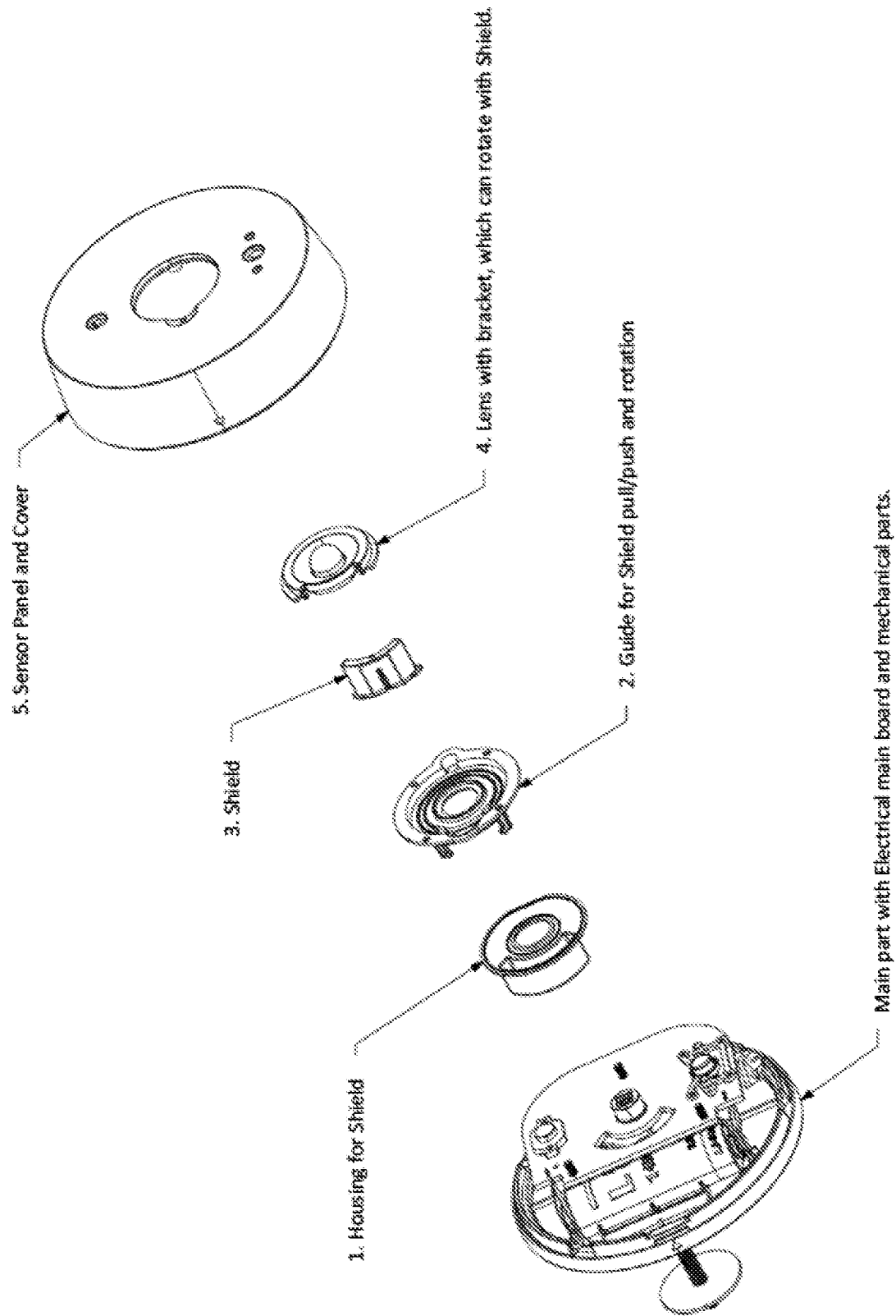
FIG. 2 schematically depicts an explosive view of the embodiments in FIG. 1 FIGS. 1(a) and 1(b)
Figure 3:
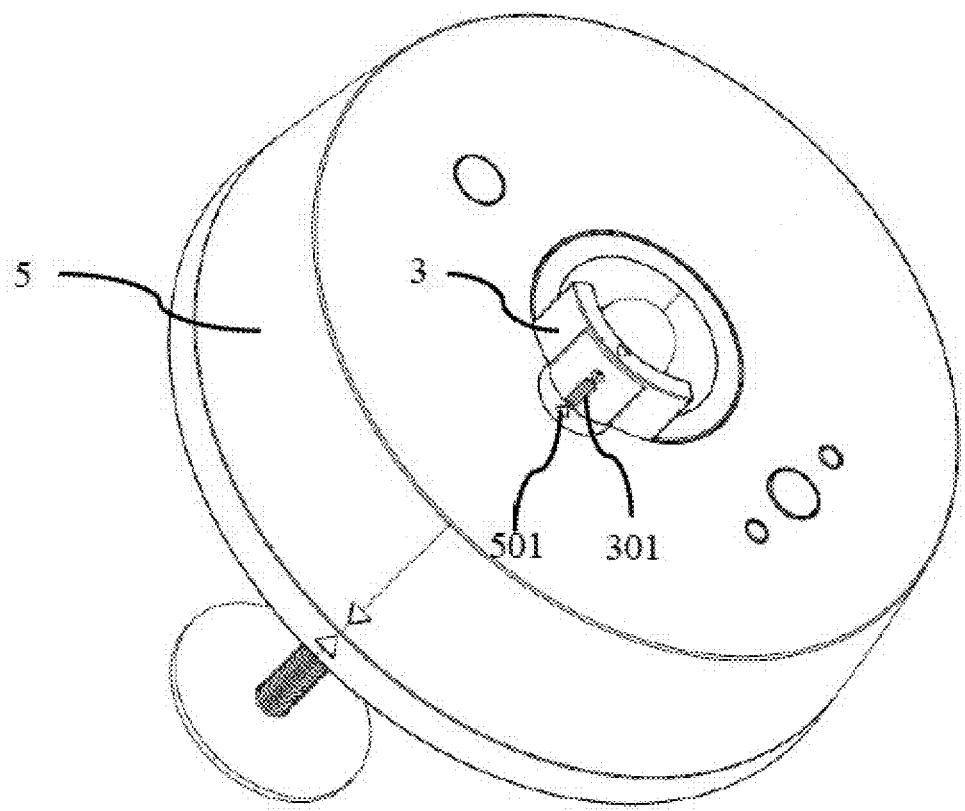
FIG. 3 depicts overview of an embodiment of the stand-alone sensor according to the present invention while the shield is at a second position (protruded out of the sensor)

Referring to FIGS. 1(a), 1(b), and 2, a shield 3 can be rested on a cover 5. The shield can be pulled out as shown in FIG. 3 and rotated by 360 degrees to protect false trigger if somebody merely passes by the door or entrance and/or exit.

A shield 3 and a sensing head (or lens) 4 are fixed by a guide 2 in cover 5. When shield 3 is mechanically pulled out using for example a finger, shield 3 and/or sensing head 4 can rotate together alone guide 2 and about a center axis of the sensor. When shield 3 rotates to a point where the line-mark 301 on shield 3 is aligned with the triangle mark 501 on cover 5 (as shown in FIG. 3), the shield 3 can be pushed back into cover 5.

Figure 4:
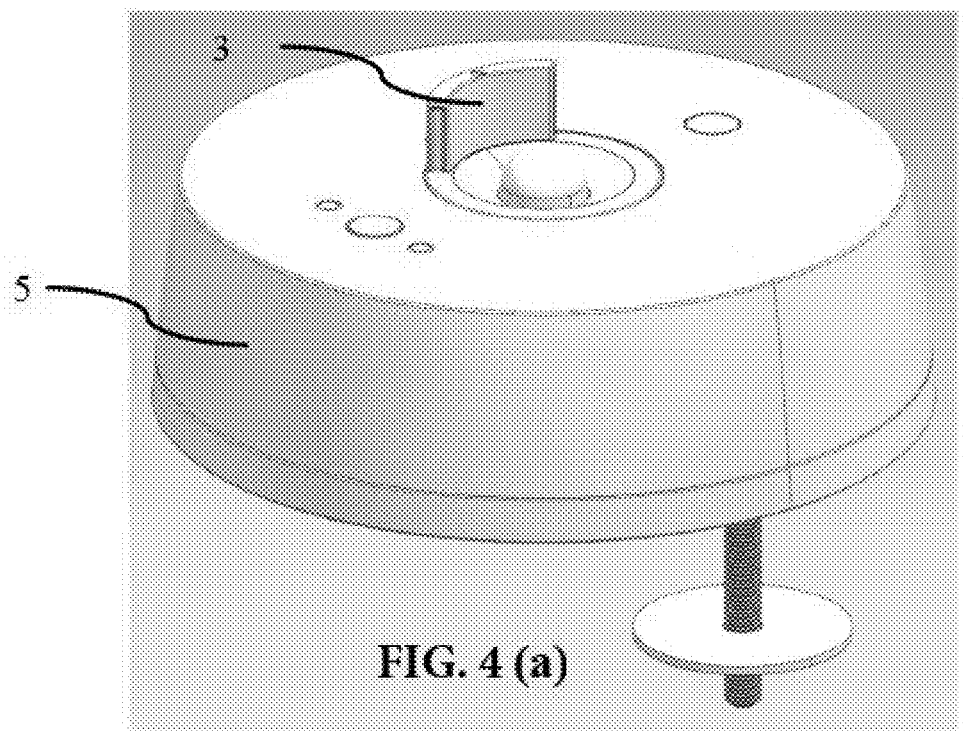
FIGS. 4(a) and 4(b) schematically depict the rotation of the shield.
Figure 4:
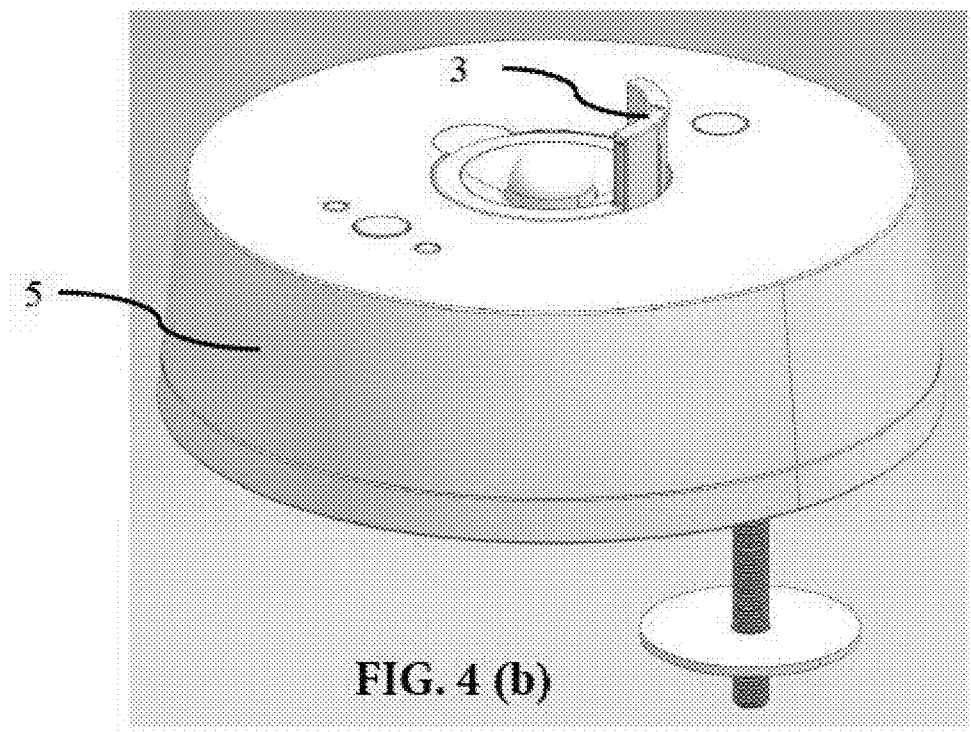

FIG. 4(a) depicts the shield 3 being pulled out from the cover 5. FIG. 4(b) depicts the shield 3 being rotated for almost 180 degrees after being pulled out.

Figure 5:
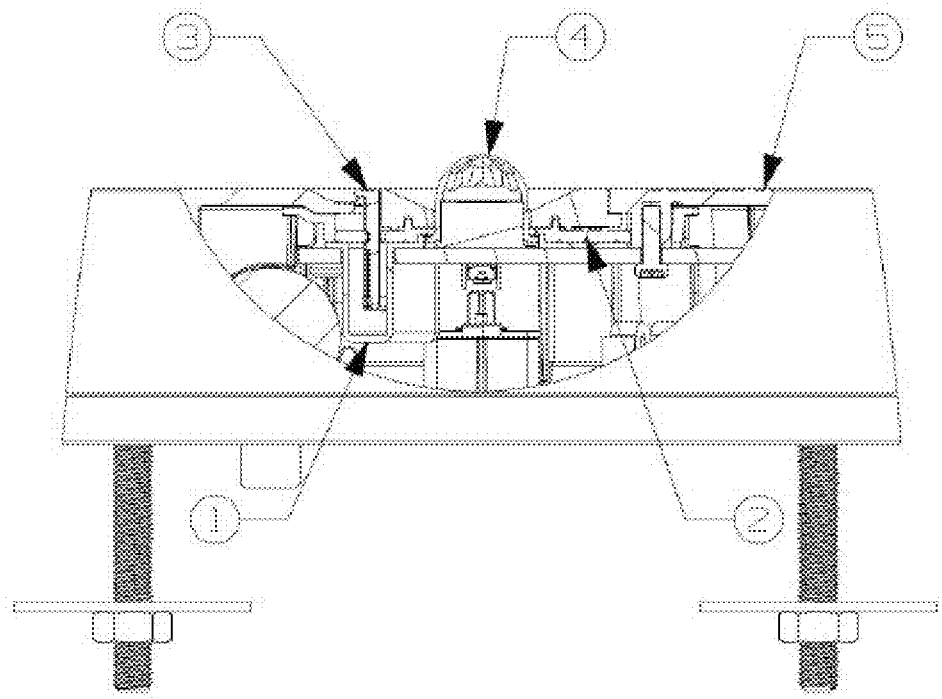
FIG. 5 is a cut-off side view of the stand-alone sensor as shown in FIGS. 1(a) and 1(b)
Figure 6:
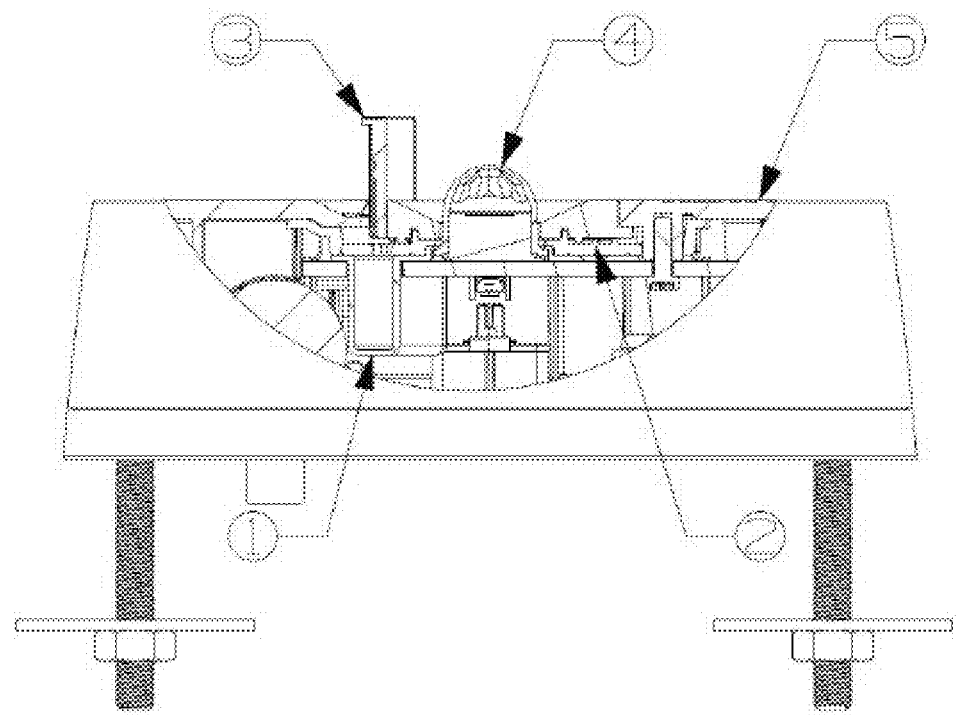
FIG. 6 is a cut-off side view of the stand-alone sensor as shown in FIG. 3.

FIG. 5 schematically depicts the internal structure when the shield 3 rests within the cover 5 (first position). FIG. 6 schematically depicts the internal structure when the shield 3 is pulled out from the cover 5, thereby protruding cover 5 (second position).

Figure 7:
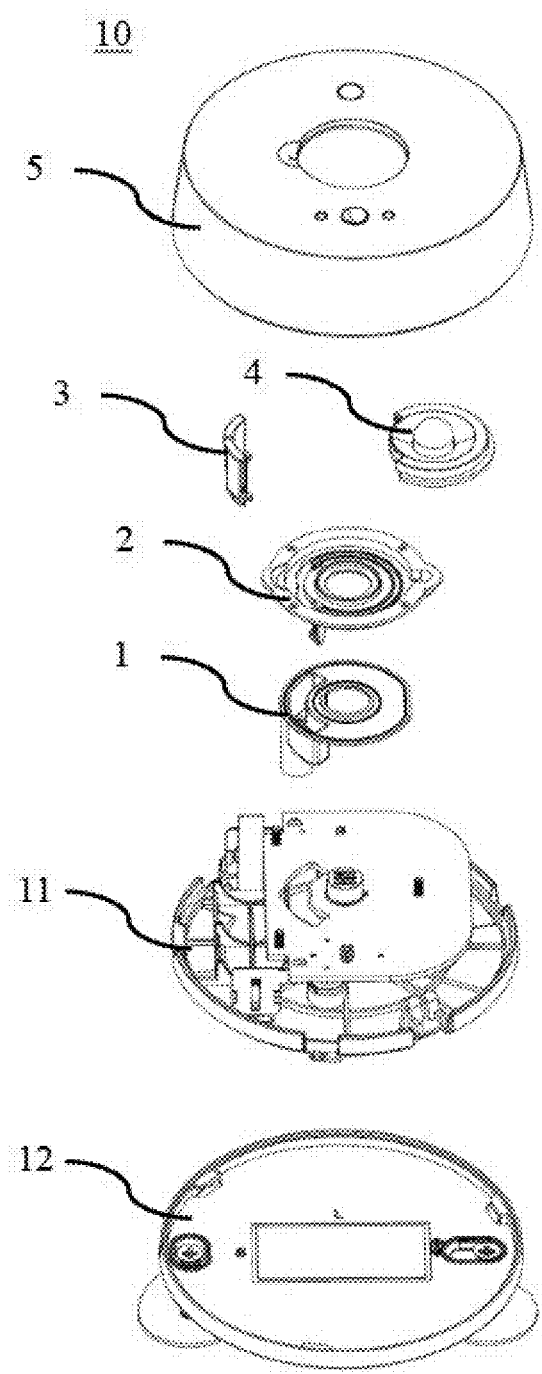
FIG. 7 schematically depicts an explosive view of a stand-alone sensor according to another embodiment of the present invention.
Figure 8:
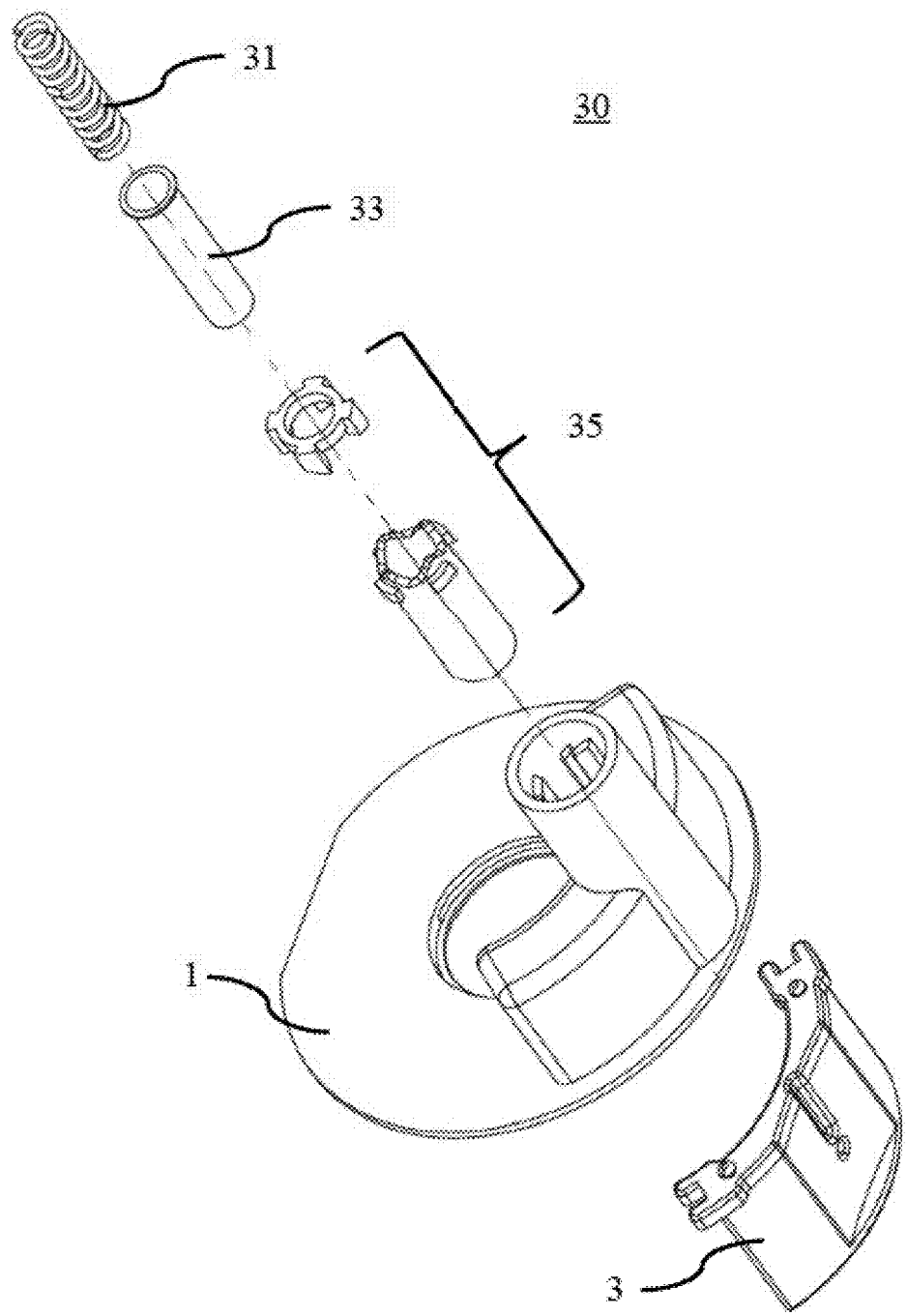
FIG. 8 depicts an explosive view of a push button shield of the sensor of FIG. 7.
Figure 9A:
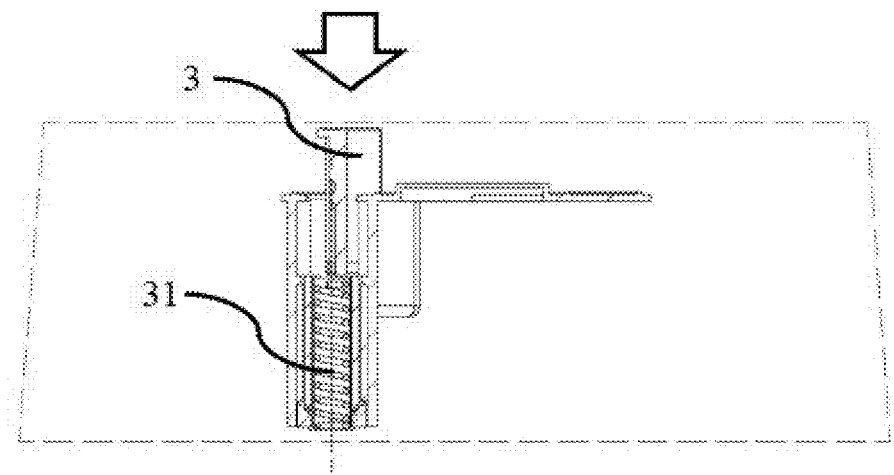
FIGS. 9(a) and 9(b) depict a sectional view of the push button shield of FIG. 7 in first and second positions.

FIG. 7 schematically depicts an explosive view of a stand-alone sensor 10 according to another embodiment of the present invention. FIG. 8 depicts an explosive view of a push button shield of the sensor of FIG. 7. FIGS. 9(a) and (b) depict a sectional of view of the push button shield 3 of FIG. 7 in first and second positions. Specifically, FIG. 7(a) depicts a shield 3 in the first (retracted) position as shown in FIG. 5, while FIG. 7(b) depicts a shield 3 in the second (protruded) position as shown in FIG. 6. The embodiment as shown in FIGS. 7(a) and (b) is substantially the same as that shown in FIGS. 5 and 6, except that shield 3 in FIGS. 7(a) and (b) constitute a push-push button.

Referring to FIGS. 7, 8, 9(a) and 9(b), in this embodiment, sensor 10 includes a base mount 12, a mean electronic assembly 11 disposed on the base mount 11, a shield housing 1 disposed on the main electronic assembly 11, a guide 2 disposed on the shield housing 1, a push button shield 3 retractably disposed in a recess of the shield housing 1 through guide 2, a lens 4 disposed on guide 2, and a cover 5. When assembled, cover 5 and base mount 12 enclose main electronic assembly 11, shield housing 1, and guide 2, with lens 4 and push button shield 3 exposed exterior of the sensor.

As shown in FIG. 8, sensor 10 additional includes a push button mechanism 30 for easily release and retract shield 3 from and to shield housing 1. In one embodiment, the push button mechanism 30 includes a spring 31, a cylinder 33, and a locking mechanism 35. Spring 11 is disposed within cylinder 33 which supports the locking mechanism 35 when assembled.

Figure 9B:
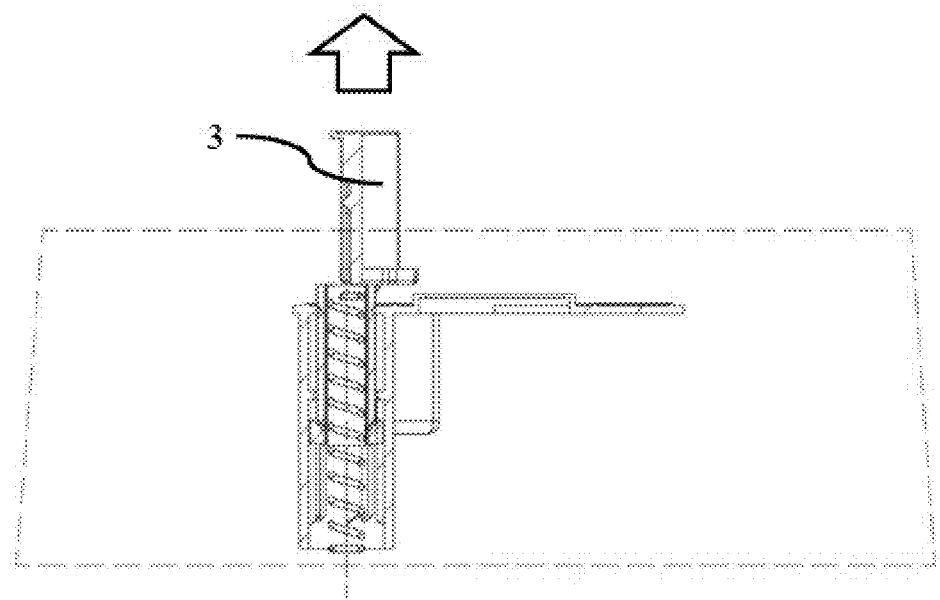

Referring to FIG. 9(a), push button shield 3 is locked within the cover 5 at the first position with spring 31 being compressed. By pushing shield 3 along a downward direction (as shown by the arrow in FIG. 9(a)), spring 31 is further compressed to unlock the locking mechanism 35, thereby allowing the elastic restoration force of spring 31 to push shield 3 upward to the second position, as shown in FIG. 9(b).

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A stand-alone sensor comprising a main part, a sensing head mounting on the main part, and a movable shield retractably disposed within a housing of a cover of the main part such that the movable shield is configured to retract into a recess of the main part, wherein the movable shield is rotatable around a center axis of the sensing head when protruded outside of the recess of the main part.

2. The stand-alone sensor of claim 1, further comprising a guide and a lens, wherein the shield and the lens can be rotated together along the guide.

3. The stand-alone sensor of claim 2, wherein the cover has a main surface acting as a panel of the sensor, and the shield is kept flush with the panel at a first position and be pulled to a second position protruding the panel.

4. The stand-alone sensor of claim 3, wherein the shield is rotatable around the sensing head when the shield is pulled to the second position.

5. The stand-alone sensor of claim 1, wherein the sensing head is configured to detect occupancy of a live objective with pyroelectric infrared effect, and wherein the shield is configured to prevent a pyroelectric infrared signal arriving at the sensing head at a predetermined direction.

6. The stand-alone sensor of claim 1, further comprising a second sensing head selected from at least one of the group consisting of daylight sensing, temperature/humidity sensing, smoke/particle sensing, and noise sensing.

7. The stand-alone sensor of claim 1, wherein the stand-alone sensor is powered with a battery.

8. The stand-alone sensor of claim 1, wherein the stand-alone sensor is mountable on a ceiling.

9. The stand-alone sensor of claim 1, further comprising a push button mechanism coupled with the shield.

10. The stand-alone sensor of claim 9, wherein the push button mechanism comprises a spring, a cylinder, and a locking mechanism, the spring being disposed within the cylinder which supports the locking mechanism when assembled.

11. The stand-alone sensor of claim 10, wherein the shield is disposed within the main part at a retracted first position and releasable from the first position to a protruded second position.

12. The stand-alone sensor of claim 11, wherein the shield is released from the first position to the second position by pushing the shield along a downward direction to unlock the locking mechanism and by using an elastic restoration force of the spring to push the shield upward to the second position.

* * * * *